(12) United States Patent
Van Berkel

(10) Patent No.: US 6,801,243 B1
(45) Date of Patent: Oct. 5, 2004

(54) LENTICULAR SCREEN ADAPTOR

(75) Inventor: Cornelis Van Berkel, Nove (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 667 days.

(21) Appl. No.: 09/119,891

(22) Filed: Jul. 21, 1998

(30) Foreign Application Priority Data

Jul. 23, 1997 (GB) .............................. 9715397

(51) Int. Cl.$^7$ ............................................ H04N 13/00
(52) U.S. Cl. ............................. 348/59; 348/51; 382/32
(58) Field of Search .............................. 348/42, 43, 44, 348/58, 59; 359/456, 454; H04N 13/00

(56) References Cited

U.S. PATENT DOCUMENTS

| | | | |
|---|---|---|---|
| 5,076,661 A | | 12/1991 | Bradley ...................... 359/456 |
| 5,357,368 A | | 10/1994 | Dominquez-Montes ..... 359/454 |
| 5,953,014 A | * | 9/1999 | Wood ......................... 345/422 |
| 6,023,263 A | * | 2/2000 | Wood ......................... 345/139 |
| 6,064,424 A | * | 5/2000 | van Berkel et al. ........... 348/51 |
| 6,118,584 A | * | 9/2000 | Van Berkel et al. ........ 359/463 |
| 6,157,424 A | * | 12/2000 | Eichenlaub .................. 349/74 |
| 6,184,969 B1 | * | 2/2001 | Fergason .................... 349/196 |

FOREIGN PATENT DOCUMENTS

| | | | |
|---|---|---|---|
| DE | 4315194 | 11/1994 | .......... G02B/27/22 |
| EP | 0545492 A1 | 6/1993 | ......... G02F/1/1335 |
| EP | 0570806 | 11/1993 | .......... H04N/13/04 |
| EP | 0724175 | 7/1996 | .......... G02B/27/22 |
| EP | 0791847 A1 | 8/1997 | .......... G02B/27/22 |
| GB | 2196166 A | 4/1998 | ............. G09F/9/00 |
| JP | A6131441 | 5/1994 | .......... G06F/15/62 |

OTHER PUBLICATIONS

"3D Displays for Video Telephone Applications" by D. Sheat et al., Eurodisplay 1993. Background to lenticular display described in application.
"Multiview 3D–LCD" van Berkel et al., SPIE Proceedings, vol. 2, 653, pp. 32–29.
"Characterisation and Optimisation of 3D–LCD" by van Berkel et al., published SPIE Proceedings, vol. 3012, pp. 108.
"Examination of the Requirements for Autostereoscopic, Full Parallax, 3D TV" by M. McCormick et al., International Broadcasting Convention 1994, IEE Conference Publication No. 347.

* cited by examiner

*Primary Examiner*—Tung T. Vo
(74) *Attorney, Agent, or Firm*—Edward W. Goodman

(57) ABSTRACT

A method for controlling pixel addressing of a pixel display device (10) to drive the display device as an N-view autostereoscopic display when a lenticular screen (15) is overlaid and image pixel data for N discrete views to be interlaced is provided. Based on data defining at least the lenticular screen lenticule pitch ($p_\mu$), the number of views N, and the lenticular screen position relative to the display device pixels (12), for each display pixel, a derivation is made as to which of the N views it is to carry. The corresponding pixel data for the assigned view is then selected as the display pixel data.

11 Claims, 2 Drawing Sheets

LENTICULAR SCREEN ADAPTOR

BACKGROUND OF THE INVENTION

1. Field of the Invention

The present invention relates to driving of pixel display devices, and in particular, the generation of interlaced images for supply to autostereoscopic display devices comprising an array of display pixels arranged in rows and columns, and an array of elongate lenticular elements extending parallel to one another overlying the display pixel array and through which the display pixels are viewed.

2. Description of the Related Art

Examples of such autostereoscopic display apparatus are described in the paper entitled "3-D Displays for Video telephone Applications" by D. Sheat et al in Eurodisplay 1993 and in UK Patent Application GB-A-2196166. In these apparatuses, the display is produced by a matrix display device comprising a matrix LC (liquid crystal) display panel having a row and column array of display elements and acting as a spatial light modulator. The lenticular elements are provided by a lenticular sheet, whose lenticules, comprising (semi) cylindrical lens elements, extend in the column direction of the display panel with each lenticule overlying a respective group of two, or more, adjacent columns of display elements and extending parallel with the display element columns. Commonly in such apparatus, the LC matrix display panel is of a conventional form, comprising regularly spaced rows and columns of display elements, as used in other types of display applications, e.g., computer display screens, although other arrangements may be provided.

Considering a direct-view type of apparatus, then the display pixels forming the display are constituted by the display elements of the display panel. In an arrangement in which each lenticule is associated with two columns of display elements, the display elements in each column provide a vertical slice of a respective 2D (sub-)image. The lenticular sheet directs these two slices and corresponding slices from the display element columns associated with the other lenticules, to the left and right eyes, respectively, of a viewer in front of the sheet so that the viewer perceives a single stereoscopic image. In other, multi-view, arrangements, in which each lenticule is associated with a group of four, or more, adjacent display elements in the row direction, and in which corresponding columns of display elements in each group are arranged appropriately to provide a vertical slice from a respective 2-D (sub-) image, then as a viewer moves his or her head, a series of successive, different, stereoscopic views are perceived creating, for example, a look-around impression.

In the design of such systems, the pitch of the lenticular array depends on the pixel pitch of the screen it is to be applied to, and will generally be given in terms of integer multiples of the pixel pitch reduced by a fraction that depends on the intended magnification of the pixels at the required viewing distance. This is true for both conventional screen arrangements (as above) with the lenticules running vertically, and also for arrangements (as will be described herein) with the lenticules running at an angle to the vertical. Such a constraint places unacceptable limits on both the manufacturing process and operational capability for these devices.

SUMMARY OF THE INVENTION

It is an object of the present invention to provide a means for adapting a pixel display to an applied lenticular screen in forming an autostereoscopic display apparatus.

It is a further object to enable the reconfiguration of existing two-dimensional pixel displays to autostereoscopic displays when a lenticular array is applied.

According to a first aspect of the present invention, there is provided a method for controlling pixel addressing of a pixel display device to drive the display device as an N-view, autostereoscopic display when a lenticular screen is overlaid and image pixel data for N discrete views to be interlaced is provided, the method comprising the steps of: obtaining data defining at least the lenticular screen. lenticule pitch, the number of views N, and the lenticular screen position relative to the display device pixels; applying a predetermined algorithm to derive, from the obtained data and for each display pixel, which of the N views it is to carry; and, for each display pixel, extracting the corresponding pixel data for the assigned view from the data provided. By deriving which of the N views each display pixel is to carry, by reference to parameters of the lenticular screen, and driving the display accordingly, the requirement for the lenticular to be tied to a particular display device is removed. This, in turn, enables the reconfiguration of existing displays, for which no specific lenticular array has been constructed, to accept a lenticular array and thus provide an autostereoscopic output.

In accordance with a further aspect of the present invention, there is provided a display configuration utility carried on a removable record carrier and for reading by means for controlling display driver circuitry of a pixel display, the utility, when run, controlling pixel addressing to drive the display device as an N-view autostereoscopic display when a lenticular screen is overlaid and image pixel data for N discrete views to be interlaced is provided, the utility effecting the steps of: obtaining data defining at least the lenticular screen lenticule pitch, the number of views N, and the lenticular screen position relative to the display device pixels; deriving, from the obtained data and for each display pixel, which of the N views it is to carry; and, for each display pixel, extracting the corresponding: pixel data for the assigned view from the data provided.

The configuration utility, which may be supplied to a user as a package with a lenticular screen and/or multiple view image data, may be operable to generate one or more predetermined display images in the form of a menu specifying data required to be input by a user, in order to enhance the "user-friendliness" of the reconfiguration operation. The data required to be input may include an angle of offset between the pixel column direction and the principal axis of a screen lenticule and/or an offset in the pixel row direction to enable the user to line up the generated views as desired. In a partial automation of the procedure, the configuration utility may comprise means operable to determine required data specifying parameters of the pixel display device from the display driver. Alternatively, the configuration utility may further comprise a plurality of data files each holding the required data for a different predetermined type of display device and/or lenticular array, together with means for generating a user-selectable menu of said types.

In accordance with a still further aspect of the present invention, there is provided a driver apparatus operable to generate a per-pixel drive signal for output to a pixel display device, said apparatus comprising an image data store coupled with display image formatting means, said formatting means being operable to extract per-pixel data from the store and format said drive signal; characterized in that said apparatus is reconfigurable to drive the display device as an N-view autostereoscopic display when a lenticular screen is overlaid, said image data store holding pixel data for N views to be interlaced, and the formatting means having an input to receive data identifying the lenticule pitch and position relative to the display device pixels and being operable to derive, for each display pixel, which of the N views it is to carry and to extract the corresponding pixel data for that view from the data store. Such an apparatus may suitably further comprise user data input means, and means for generating one or more display screens to appear on the display and indicating data required to be input by the user. Also, to assist in the installation procedure for a particular lenticular, the apparatus may further comprise means for generating one or more predetermined test screens to appear on the display, said test screens being such as to indicate to the user the effect of variation of one or more input parameters, such as the above-referenced horizontal offset.

Further features and advantages of the present invention will become apparent from reading of the following description of embodiments of the present invention, which description details the derivation of the required view per pixel.

BRIEF DESCRIPTION OF THE DRAWINGS

Embodiments of an autostereoscopic display apparatus in accordance with the invention will now be described, by way of example, with reference to the accompanying drawings, in which.

DESCRIPTION OF THE PREFERRED EMBODIMENTS

Figure 2:
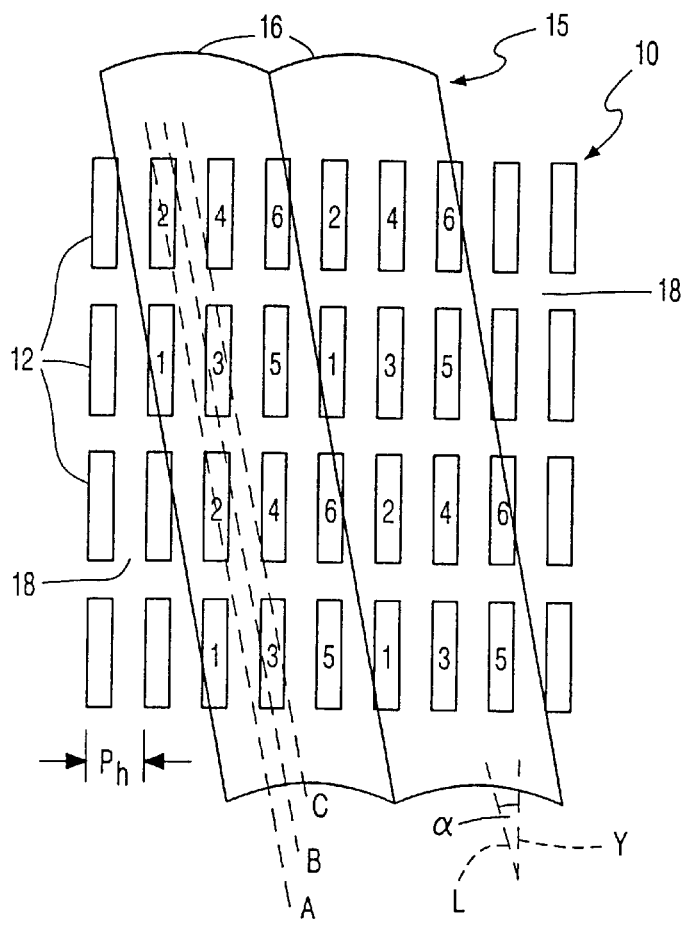
FIG. 2 is a schematic plan view of a part of the display element array of the display panel of FIG. 1, providing a six view output.
Figure 3:
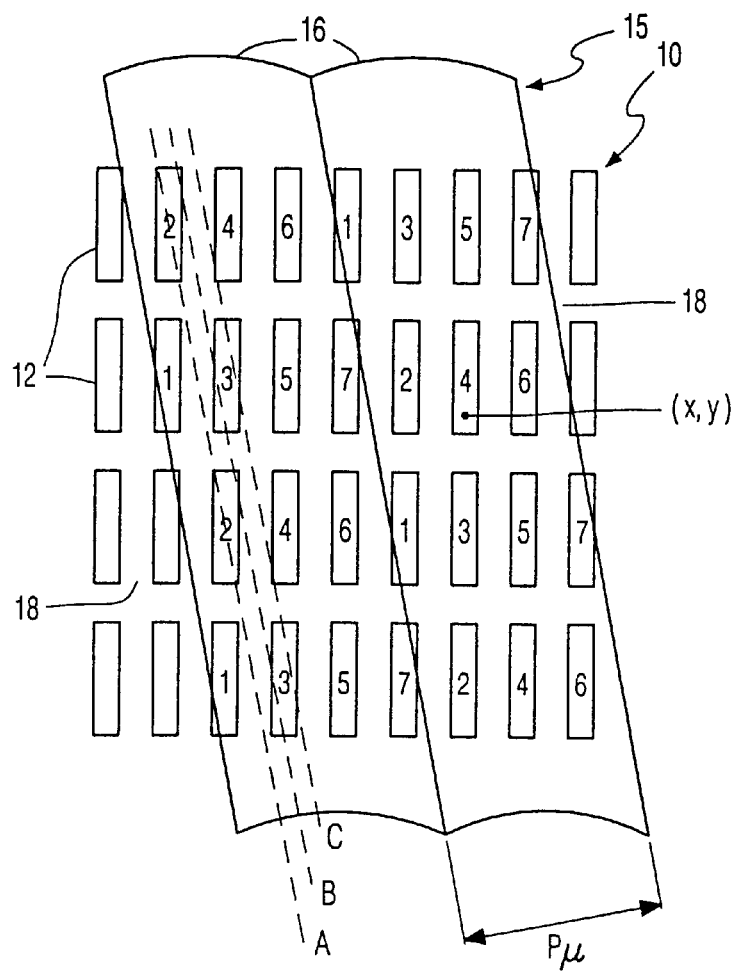
FIG. 3 is similar to FIG. 2 but illustrates an arrangement of the lenticular elements in relation to the display elements for providing a seven view output.

In the following example, a direct-view type of 3D-LCD lenticular array display apparatus having a slanted arrangement of lenticulars will be initially described with reference to FIGS. 1 to 3, in order to illustrate a suitable host system for the present invention. A more detailed description of this apparatus, together with a number of modifications and variations thereto, is given in the commonly-assigned European Patent Application Number EP-A-0791847 (published 27th Aug. 1997 with an earliest priority date of 23rd Feb. 1996), corresponding to U.S. patent application Ser. No. 08/798,678, filed Feb. 12, 1997, the disclosure of which is herein incorporated by reference.

It will be understood that the Figures are merely schematic and are not drawn to scale. For clarity of illustration, certain dimensions may have been exaggerated while other dimensions may have been reduced. Also, where appropriate, the same reference numerals and letters are used throughout the Figures to indicate the same parts and dimensions.

Figure 1:
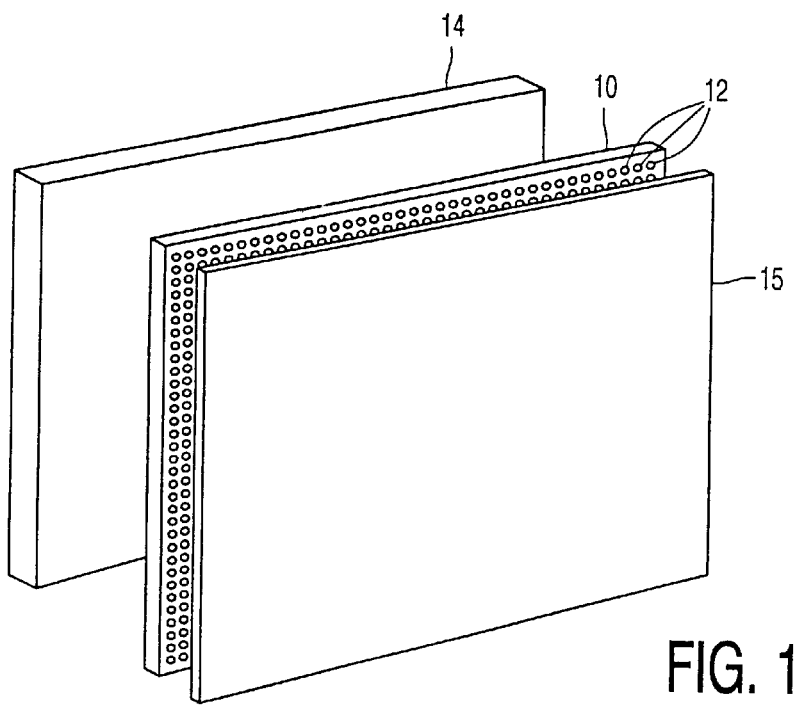
FIG. 1 is a schematic perspective view of an embodiment of autostereoscopic display apparatus.

Referring to FIG. 1, the display apparatus includes a conventional LC matrix display panel 10 used as a spatial light modulator and comprising a planar array of individually addressable and similarly sized display elements 12 arranged in aligned rows and columns perpendicularly to one another. While only a few display elements are shown, there may, in practice, be around 800 columns (or 2400 columns if color, with RGB triplets used to provide a full color display) and 600 rows of display elements. Such panels are well known and will not be described here in detail.

The display elements 12 are substantially rectangular in shape and are regularly spaced from one another with the display elements in two adjacent columns being separated by a gap extending in column (vertical) direction and with the display elements in two adjacent rows being separated by a gap extending in the row (horizontal) direction. The panel 10 is of the active matrix type in which each display element is associated with a switching element, comprising for example, a TFT or a thin film diode, TFD, situated adjacent the display element.

The display panel 10 is illuminated by a light source 14 which, in this example, comprises a planar back-light extending over the area of the display element array. Light from the source 14 is directed through the panel with the individual display elements being driven, by appropriate application of drive voltages, to modulate this light in conventional manner to produce a display output. The array of display—pixels constituting the display produced thus corresponds with the display element array, each display element providing a respective display pixel.

Over the output side of the panel 10, opposite that facing the light source, there is disposed a lenticular sheet 15 comprising an array of elongate, parallel, lenticules, or lens elements, acting as optical director means to provide separate images to a viewer's eyes, producing a stereoscopic display to a viewer facing the side of the sheet 15 remote from the panel 10. The lenticules of the sheet 15, which is of conventional form, comprise optically cylindrically converging lenticules, for example, formed as convex cylindrical lenses or graded refractive index cylindrical lenses. Autostereoscopic display apparatus using such lenticular sheets in conjunction with matrix display panels are well known in the art although, unlike the conventional arrangement in such apparatuses, with lenticules extending parallel to the display pixel columns (corresponding to the display element columns), the lenticules in the apparatus of FIG. 1 are arranged slanted with respect to the columns of display pixels, that is, their main longitudinal axis is at an angle to the column direction of the display element array. This arrangement has been found to provide a number of benefits in terms of reduced resolution loss and enhanced masking of the black area between display elements, as is described in the above-referenced application number EP-A-0791 847.

In the purpose-built embodiment illustrated, the pitch of the lenticules is chosen in relation to the pitch of the display elements in the horizontal direction according to the number of views required, as will be described, and each lenticule, apart from those at the sides of the display element array, extends from top to bottom of the display element array. FIG. 2 illustrates an example arrangement of the lenticules in combination with the display panel for a typical part of the display panel. The longitudinal axis of the lenticules, L, is slanted at an angle $\alpha$ to the column direction,Y. In this example, the spacing between the longitudinal axes of the parallel lenticules is of such a width with respect to the pitch of the display elements in a row, and slanted at such an angle with respect to the columns of display elements, as to provide a six view system. The display elements 12 are numbered (1 to 6) according to the view-number to which they belong. The individual, and substantially identical, lenticules of the lenticular sheet 15, here referenced at 16, each have a width which corresponds approximately to three adjacent display elements in a row, i.e., the width of three display elements and three intervening gaps. Display elements of the six views are thus situated in groups comprising display elements from two adjacent rows, with three elements in each row.

The individually operable display elements are driven by the application of display information in such a manner that a narrow slice of a 2D image is displayed by selected display elements under a lenticule. The display produced by the panel comprises six interleaved 2D sub-images constituted by the outputs from respective display elements. Each lenticule 16 provides six output beams from the underlying display elements with view-numbers 1 to 6, respectively, whose optical axes are in mutually different directions and angularly spread around the longitudinal axis of the lenticule. With the appropriate 2D image information applied to the display elements and with a viewer's eyes being at the appropriate distance to receive different ones of the output beams, then a 3D image is perceived. As the viewer's head moves in the horizontal (row) direction, then a number of stereoscopic images can be viewed in succession. Thus, a viewer's two eyes would see, respectively, for example, an image composed of all display elements "1" and an image composed of all display elements "2". As the viewer's head moves, images comprised of all display elements "3" and all display elements "4" will be seen by respective eyes, then images comprised of all display elements "3" and all display elements "5", and so on. At another viewing distance, closer to the panel, the viewer may, for example, see views "1" and "2" together with one eye and views "3" and "4" together with the other eye.

The plane of the display elements 12 coincides with the focal plane of the lenticules 16, the lenticules being suitably designed and spaced for this purpose, and consequently position within the display element plane corresponds to viewing angle. Hence all points on the dashed line A in FIG. 2 are seen simultaneously by a viewer under one specific horizontal (row direction) viewing angle as are all points on the dashed line B in FIG. 2 from a different viewing angle. Line A represents a (monocular) viewing position in which only display elements from view "2" can be seen. Line B represents a (monocular) viewing position in which display elements from both view "2" and view "3" can be seen together. Line C in turn represents a position in which only display elements from view "3" can be seen. Thus, as the viewer's head moves, with one eye closed, from the position corresponding to line A to line B and then line C a gradual change-over from view "2" to view "3" is experienced.

The slanting lenticule arrangement can be applied to both monochrome and color displays. Considering, for example, the six-view scheme of FIG. 2 applied to an LC display panel in which a color microfilter array is associated with the display element array and arranged with the color filters running in R-G-B column triplets (i.e., with three successive columns of display elements displaying red, green and blues respectively), then if the view "1" display elements in the second row are red, then the view "1" display elements of the fourth row will be green. A similar situation occurs for the other views. Hence, each view will have colored rows which means that for a color display, the vertical resolution is divided by three compared with a monochrome display.

While the use of a slanted lenticular in the 6-view arrangement increases the horizontal resolution considerably, the vertical resolution is rather poor. This situation can be significantly improved, however, by applying the premise that each lenticule need not overlie and cooperate optically with a whole number of adjacent display elements in a single row. In further examples, again using the same display panel, the lenticules are designed such that, rather than covering 3 or 4 display elements on each row as: in the above-described arrangements, they instead cover 2½ or 3½ display elements, that is, the pitch of the lenticular elements corresponds to 2½ and 3½ times the pitch of the display elements in the row direction, to provide a 5-view and a 7-view system, respectively. In these, the output beams, 5 or 7, provided by each lenticule from the underlying display elements have optical axes which are in mutually different directions and:spread angularly around the longitudinal axis of the lenticule. The arrangement for the seven view system is shown in FIG. 3. As before, the display elements are numbered according to the view number to which they belong and the dashed lines A, B and C indicate simultaneously—viewed points for respective different horizontal viewing angles. As can be seen, the view numbers under each lenticule 16 are not repeated along the display row (as was the case in the FIG. 2 arrangement) but are offset by one row between adjacent lenticules. This kind of arrangement provides an improved balance between resulting horizontal and vertical resolution. This principle could be extended to lenticules covering, for example, 2⅓ or 2¼ display elements and down to a minimum of 1½ display elements, providing 3 views.

In another embodiment, providing an 8—view system, and using the same display panel, the lenticules are slanted at the same angle as before but have a 33⅓% larger pitch and cover four display elements on each row. Display elements of the 8 views are thus situated in groups comprising display elements from two adjacent rows, four in each row. Each lenticule 16 in this case provides eight output beams from the underlying display elements whose optical axes are in mutually different directions and angularly spread around the longitudinal axis of the lenticule. This arrangement has been found to give further improvement in vertical resolution.

While the matrix display panel in the above described embodiments comprises an LC display panel, it is envisaged that other kinds of electro-optical spatial light modulators and flat panel display devices, such as electroluminescent or plasma display panels, could be used.

As mentioned above, the number of pixels per lens does not have to be an integral number, although to date autostereoscopic displays have used regular repeating patterns of view pixels such as to give affixed arrangement of an integer number of views per lenticule. Applicant has recognized that this use of non-integer numbers of pixels per lens may be extended to enable the provision of a means whereby any arbitrary lenticular screen can be used on any (flat panel) pixel display simply by adjusting the mapping between the multiple perspective views and the pixels.

Figure 4:
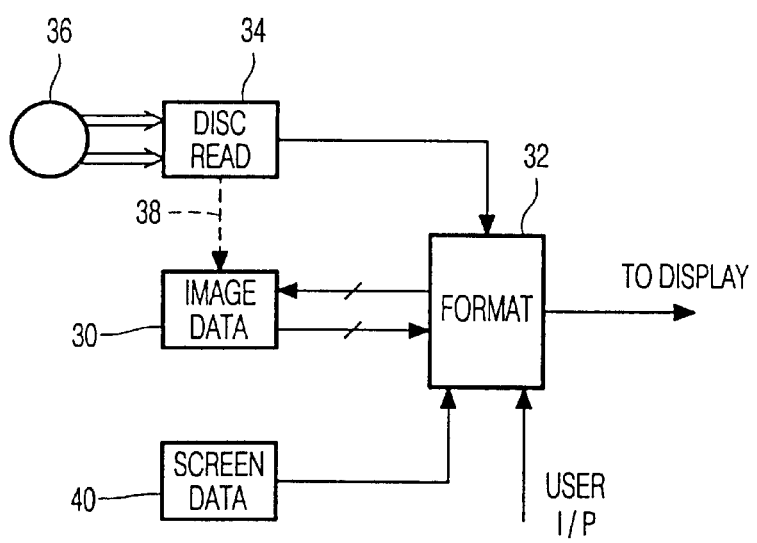
FIG. 4 is a block schematic diagram illustrating components of a display driver apparatus embodying the invention.

FIG. 4 is a block schematic diagram illustrating features of a display driver apparatus embodying the invention and operable to generate a per-pixel drive signal for output to a pixel display device. The driver apparatus has an image data store 30 coupled with a display image formatting stage 32, the formatting stage 32 being operable to extract per-pixel data from the store and format the drive signal. Coupled with the formatting stage is a disc reader 34 (reading optical or magnetic disc 36) which supplies the reconfiguration utility to the formatting stage 32. Optionally, as indicated by dashed line 38, the disc 36 may also be the carrier of image data for autostereoscopic display, which data is loaded to store 30.

In addition to being coupled to sources of image data and the reconfiguration utility, the formatting stage 32 has an input to receive data supplied by a user specifying parameters of the lenticular array being applied, which parameters are discussed in detail below. In the example shown, the required parameters of the pixel screen are accessed from a local store 40 within the display driver, rather than being required as further user inputs.

In order to simplify the operation for the user, the image data in store 30 may include one or more prompt screens to indicate to the user the required data. Also, in place of the screen data store 40, there may be downloaded from the disc 36 tables of specifications for well-known display devices, with the user being presented with a menu from which a simple selection may be made. Where the lenticular array is supplied as part of a package with the reconfiguration utility and display data, at least some of the lenticular parameters may be already written into the utility.

A further simplification that may be provided involves the downloading from disc 36 to store 30 of one or more predetermined test screens which may be selected by the formatting stage 32 to appear on the display. These test screens highlight for the user the effect of variation of one or more input parameters, such as horizontal offset.

Turning now to the derivation of the expression that assigns a view number to every pixel in the LCD, and referring again to FIGS. 2 and 3, the horizontal offset of a point x,y in the plane of the LCD with respect to the edge of the lenticular under which it is positioned is given by:

$$x_{offset} = (x - y \tan(a)) \mod \left( \frac{m+1}{m} \frac{p_\mu}{\cos a} \right)$$

in which $p_\mu$ is the pitch of each of the lenticules (or microlenses) measured perpendicularly across its long axis, $\alpha$ is the angle of offset of the lenticules to the vertical (column) direction, $p_\mu/\cos\alpha$ is the pitch measured along the horizontal x-axis, and m is the magnification.

When projected into the plane of the LCD, using the viewing position as the origin, the horizontal pitch of the lenticules is given by:

The magnification m can be expressed in terms of the viewing distance $$\left( \frac{m+1}{m} \frac{p_\mu}{\cos a} \right)$$

D and the focal length of the lenticules f, as m+1=f.D. To simplify things, we divide the projected horizontal lens pitch by the pixel pitch of the LCD $p_h$ and call this the number of views per lenticule X, i.e.:

$$X = \frac{m+1}{m} \frac{p_\mu}{p_h \cos a}$$

For a datagraphic LCD in which pixels are arranged as an orthogonal array of RGB color triplets, the coordinates x,y can be expressed in terms of the pixel number k,l and the horizontal pixel pitch as follows:

x=k$p_h$

Y=3l$p_h$

Note that the indices k,l point to individual red, green or blue (sub)pixels and not to color triplets. Other relationships between pixel indices and x,y can be written down for displays with different pixel layouts, such as video and projection displays.

Dividing the expression of $x_{offset}$ above by the projected horizontal lens pitch and inserting the definitions for X,k and l, we find:

$$N_{view} = \frac{(k + k_{offset} - 3/\tan a) \mod X}{X} N$$

N is the range of view numbers or the total number of views. $N_{view}$ is the value generated per pixel identifying which of the interlaced views is to provide the data for that pixel: this will generally be a non-integer number, so in the actual mapping, the nearest integer is taken. The parameter $k_{offset}$ is introduced into the formula to accommodate an arbitrary horizontal shift of the lenticular lens array with respect to the LCD.

Applying the above to reconfigure an existing two-dimensional display, it will be seen that only four parameters are required to describe the mapping between pixels in the source images and the 3D-LCD output image (dropping to only three where a conventional non-slanted lenticular array is used and $\alpha$=0): these are X, $\alpha$, N and $k_{offset}$. Using an interactive or automated configuration utility as described herein, these can be set for any lenticular/LCD combination and then used to specify the view interlacing or "weaving" process. Although the above expression is neatly expressed in terms of these parameters, other sets of parameters can be chosen which may be more intuitively obvious to the user, such as $p_\mu/p_h$ (the ratio of the lenticule to pixel pitches), $\alpha$, D and $k_{offset}$.

From reading the present disclosure, other modifications and variations will be apparent to persons skilled in the art. Such modifications and variations may involve equivalent features and other features which are already known in the art and which may be used instead of or in addition to features already disclosed herein. Although claims have been formulated in this Application to particular combinations of features, it should be understood that the scope of the disclosure of the present application includes any and every novel feature or any novel combination of features disclosed herein either explicitly or implicitly and any generalization thereof, whether or not it relates to the same invention as presently claimed in any Claim and whether or not it mitigates any or all of the same technical problems as does the present invention. The Applicants hereby give notice that new claims may be formulated to such features and/or combinations of such features during prosecution of the present application or of any further application derived therefrom.

What is claimed is:

1. A method for controlling pixel addressing of a pixel display device to drive the display device as an N-view autostereoscopic display when a lenticular screen is overlaid and image pixel data for N discrete views to be interlaced is provided, the method comprising the steps:

obtaining data defining at least the lenticular screen lenticule pitch, the number of views N, and the lenticular screen position relative to the display device pixels;

applying a predetermined algorithm to derive, from the obtained data and for each display pixel, which of the N views is to be carried; and for each display pixel, extracting the corresponding pixel data for the assigned view from the image pixel data provided.

2. A method as claimed in claim 1, wherein the data defining the lenticular screen position includes an angle of offset between the pixel column direction and the principal axis of a screen lenticule of the lenticular screen.

3. A method as claimed in claim 1, wherein the data defining the lenticular screen position includes an offset in the pixel row direction.

4. A display configuration utility carried on a removable record carrier to be read by means for controlling display driver circuitry of a pixel display, the utility, when run, controlling pixel addressing to drive the display device as an N-view autostereoscopic display when a lenticular screen is overlaid and image pixel data for N discrete views to be interlaced is provided, the utility effecting the steps of:

obtaining data defining at least the lenticular screen lenticule pitch, the number of views N, and the lenticular screen position relative to the display device pixels;

deriving, from the obtained data and for each display pixel, which of the N views is to be carried; and for each display pixel, extracting the corresponding pixel data for the assigned view from the image pixel data provided.

5. A configuration utility as claimed in claim 4, wherein said configuration utility generates one or more predetermined display images in the form of a menu specifying data required to be input by a user.

6. A configuration utility as claimed in claim 4, comprising means for determining required data specifying parameters of the pixel display device from the display driver.

7. A configuration utility as claimed in claim 4, further comprising a plurality of data files each holding the required data for a different predetermined type of display device, and means for generating a user-selectable menu of said types.

8. A configuration utility as claimed in claim 4, further comprising a plurality of data files each holding the required data for a different predetermined type of lenticular array, and means for generating a user-selectable menu of said types.

9. Driver apparatus for generating a per-pixel drive signal for output to a pixel display device, said apparatus comprising an image data store coupled with display image formatting means, said display image formatting means extracting per-pixel data from the store and format said drive signal; characterized in that said apparatus is reconfigurable to drive the display device as an N-view autostereoscopic display when a lenticular screen is overlaid, said image data store holding pixel data for N views to be interlaced, and the display image formatting means having an input for receiving data identifying the lenticule pitch and position relative to the display device pixels, said display image formatting means deriving, for each display pixel, which of the N views is to be carried, and extracting the corresponding pixel data for that view from the data store.

10. Apparatus as claimed in claim 9, wherein said apparatus further comprises user data input means, and means for generating one or more display screens for appearing on the display and indicating data required to be input by the user.

11. Apparatus as claimed in claim 9, wherein said apparatus further comprises means for generating one or more predetermined test screens for appearing on the display, said test screens indicating to the user the effect of variation of one or more input parameters.

* * * * *